US011266927B2

(12) United States Patent
Bikkina (10) Patent No.: US 11,266,927 B2
(45) Date of Patent: Mar. 8, 2022

(54) METHOD FOR DISSOLVED GAS SEPARATION

(71) Applicant: THE BOARD OF REGENTS FOR OKLAHOMA STATE UNIVERSITY, Stillwater, OK (US)

(72) Inventor: Prem Kumar Bikkina, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 292 days.

(21) Appl. No.: 16/569,248

(22) Filed: Sep. 12, 2019

(65) Prior Publication Data

US 2020/0094170 A1 Mar. 26, 2020

Related U.S. Application Data

(60) Provisional application No. 62/734,001, filed on Sep. 20, 2018.

(51) Int. Cl.
*B01D 19/00* (2006.01)
(52) U.S. Cl.
CPC ..... *B01D 19/0073* (2013.01); *B01D 19/0005* (2013.01)
(58) Field of Classification Search
None
See application file for complete search history.

(56) References Cited

PUBLICATIONS

Siedel, S., et al., Analysis of the Interface Curvature Evolution During Bubble Growth, Heat Transfer Engineering, vol. 35, No. 5, 2014, pp. 528-536.
Lee, G., et al.. Assessing Nucleation in Cloud Formation Modelling for Brown Dwarf and Exoplanet Atmospheres, EGU General Assembly Conference, 2015, p. 1.
Wu, W., et al., A Study on Bubble Detachment and the Impact of Heated Surface Structure in Subcooled Nucleate Boiling Flows, Nuclear Engineering and Design, vol. 238, 2008, pp. 2693-2698.
Uzel, S., et al., Modeling the Cycles of Growth and Detachment of Bubbles in Carbonated Beverages, J. Phys. Chem. B, American Chemical Society, 2006, pp. 7579-7586.
Tawfik, M., et al., On the Relation Between Onset of Bubble Nucleation and Gas Supersaturation Concentration, Electrochimica Acta, vol. 146, 2014, pp. 792-797.
Planeta, J., et al., Distribution of Sulfur-Containing Aromatics Between [hmim][Tf 2 N] and Supercritical CO 2: A Case Study for Deep Desulfurization of Oil Refinery Streams by Extraction with Ionic Liquids, Green Chemistry, 2005, pp. 70-77.
Perez-Garibay, R., et al., Gas Dispersion Measurements in Microbubble Flotation Systems, Minerals Engineering, vol. 26, 2012, pp. 34-40.

(Continued)

*Primary Examiner* — Christopher P Jones
*Assistant Examiner* — Phillip Y Shao
(74) *Attorney, Agent, or Firm* — McAfee & Taft (57) ABSTRACT

Techniques in the disclosure use non-wetting or wetting surfaces to promote or hinder separation of gas from solution in a liquid. The systems and processes promote bubble nucleation and/or promote separation of a gas or gases from a liquid using non-wetting surfaces. Also, the systems and processes suppress bubble nucleation in order to create supersaturated solutions of gas or gases in a liquid by using wetting surfaces.

9 Claims, 7 Drawing Sheets

(56) References Cited

PUBLICATIONS

Mangan, M., et al., Delayed, Disequilibrium Degassing in Rhyolite Magma: Decompression Experiments and Implications for Explosive Volcanism, Earth and Planetary Science Letters, 2000, pp. 441-455.

Kortekaas, T.F., et al., Liberation of Solution Gas During Pressure Depletion of Virgin and Watered-Out Oil Reservoirs, SPE Reservoir Engineering, 1991, pp. 329-335.

Golbin, M., et al., Numerical Modeling of Bubble Growth in the Solution Gas Drive Process in Heavy Oil Reservoirs, Advances in Chemistry Research, vol. 28, Chapter 7, 2015, p. 209.

Gateau, J., et al., Statistics of Acoustically Induced Bubble-Nucleation Events in Invitro Blood: A Feasibility Study, Ultrasound in Med. & Biol., vol. 39, No. 10, 2013, pp. 1812-1825.

Gateau, J., et al., In Vivo Bubble Nucleation Probability in Sheep Brain Tissue, Phys. Med. Biol., vol. 56, 2011, p. 7001-7015.

Elman, N., et al., An Implantable MEMS Drug Delivery Device for Rapid Delivery in Ambulatory Emergency Care, Biomed Microdevices, 2009, pp. 625-631.

Kalikmanov, V., et al., New Developments in Nucleation Theory and Their Impact on Natural Gas Separation, SPE International, 2007, pp. 1-5.

Lubetkin, S., The Fundamentals of Bubble Evolution, Chemical Society Reviews, 1995, pp. 243-250.

Wang, M., et al., The Intensification Technologies to Water Electrolysis for Hydrogen Production—A Review, Renewable and Sustainable Energy Reviews, 2014, pp. 573-588.

Jones, S., et al., Bubble Nucleation from Gas Cavities—A Review, Advances in Colloid and Interface Science, 1999, pp. 27-50.

Finkelstein, Y., et al., Formation of Gas Bubbles in Supersaturated Solutions of Gases in Water, AIChE Journal, vol. 31, No. 9, 1985, pp. 1409-1419.

Ryan, W. L., et al., Bubble Formation in Water at Smooth Hydrophobic Surfaces, Journal of Colloid and Interface Science, 1993, pp. 312-317.

Ryan, W. L., et al., Bubble Formation at Porous Hydrophobic Surfaces, Journal of Colloid and Interface Science, 1998, pp. 101-107.

Cho, H., et al., Bubble Point Measurements of Hydrocarbon Mixtures in Mesoporous Media, Energy & Fuels, 2017, pp. 3436-3444.

Chen, Q., et al., Electrochemical Generation of a Hydrogen Bubble at a Recessed Platinum Nanopore Electrode, Langmuir, 2015, pp. 4573-4581.

Chen, Q., et al., Electrochemical Measurements of Single H2 Nanobubble Nucleation and Stability at Pt Nanoelectrodes, The Journal of Physical Chemistry Letters, 2014, pp. 3539-3544.

Hanafizadeh, P., et al., The Effect of Gas Properties on Bubble Formation, Growth, and Detachment, Particulate Science and Technology, 2015, pp. 645-651.

Oguz, H. N., et al., Dynamics of Bubble Growth and Detachment From a Needle, J. Fluid Mech., vol. 257, 1993, pp. 111-145.

Chen, D., et al., Prediction of Bubble Detachment Diameter in Flow Boiling Based on Force Analysis, Nuclear Engineering and Design, 2012, pp. 263-271.

Phan, H. T., et al., How Does Surface Wettability Influence Nucleate Boiling?, ScienceDirect, C. R. Mecanique 337, 2009, pp. 251-259.

De Oliveira, R., et al., Measurement of the Nanoscale Roughness by Atomic Force Microscopy: Basic Principles and Applications, 2012, pp. 147-174.

Ishida, N., et al., Nano Bubbles on a Hydrophobic Surface in Water Observed by Tapping-Mode Atomic Force Microscopy, Langmuir, 2000, pp. 6377-6380.

Ishida, N., et al., Interaction Forces Between Chemically Modified Hydrophobic Surfaces Evaluated by AFM—The Role of Nanoscopic Bubbles in the Interactions, Minerals Engineering, 2006, pp. 719-725.

METHOD FOR DISSOLVED GAS SEPARATION

CROSS-REFERENCE TO RELATED APPLICATIONS

This application claims the benefit of U.S. Provisional Application No. 62/734,001 filed Sep. 20, 2018, which is hereby incorporated by reference.

FIELD

The present invention relates generally to the separation of gases from liquids, and more specifically, to processes for the liberation of gases from liquids through stages of nucleation, bubble growth and detachment.

BACKGROUND

Liberation of gases from liquids is of primary importance to numerous natural and industrial processes such as boiling, cloud formation, volcanic eruption, food and beverage production, biological, mineral, nuclear, pharmaceutical, electrochemical, and petroleum production and refining. Natural gas evolution in saturated oil reservoirs and gas separation in wellbores and surface facilities are some examples of gas liberation from supersaturated liquids in the petroleum industry. The gas-liberation kinetics influence production strategies and the associated equipment-design criteria, so critical insights into gas liberation kinetics are necessary for petroleum production operations.

SUMMARY

This disclosure is directed, among other things, at systems and processes that promote bubble nucleation and/or promote separation of a gas or gases from a liquid. Also, in some embodiments, the systems and processes suppress bubble nucleation in order to create supersaturated solutions of gas or gases in a liquid.

In embodiments that promote bubble nucleation and/or promote separation of a gas or gases from a liquid, the process comprises providing the solution of the gas in a liquid. The solution is subjected to conditions such that a supersaturated state of gas in the liquid is produced. The solution is contacted with a non-wetting surface so as to induce separation of the gas out of the solution. Typically, the liquid has a contact angle with the non-wetting surface of at least 80°, and optionally the contact angle is greater than 90°, greater than 95°, greater than 100° or greater than 110°.

Typically in the process, the solution is provided at a first pressure at which the liquid is saturated with gas in solution; then the step of subjecting the solution to conditions to produce a supersaturated state comprises reducing the pressure of the solution from the first pressure to a second pressure lower than the first pressure. The first pressure generally will be greater than atmospheric pressure. Optionally the first pressure is at least 1000 mbar greater than atmospheric pressure, or at least 2000 mbar, at least 3000 mbar, at least 4000 mbar, or at least 5000 mbar greater than atmospheric pressure. Generally, the second pressure will be less than 1000 mbar greater than atmospheric pressure, and typically, the second pressure will be about atmospheric pressure.

In the embodiments, the solution can be contacted with the non-wetting surface after the reduction of the pressure to the second pressure, but more typically, the solution will be contacted with the non-wetting surface prior to the pressure of the solution reaching the second pressure. In the embodiments, the solution can be contacted with the non-wetting surface before any reduction in pressure from the first pressure has occurred.

In embodiments, the liquid will be an aqueous based fluid (and can be water) and the non-wetting surface is hydrophobic. In embodiments, the liquid will be a non-polar hydrocarbon based fluid and the non-wetting agent will be oleophobic. In some of either of these embodiments, the gas will dissolve in the liquid (in a non-supersaturated state) to an amount of at least 0.01 grams of gas per 100 g of liquid (or at least 0.015 grams per 100 g of liquid) at room temperature and atmospheric pressure.

In embodiments that suppress bubble nucleation in order to create supersaturated solutions of gas or gases in a liquid, the process comprises providing the solution of the gas in a liquid. The solution is at a first pressure so that the liquid is saturated with gas in solution at the first pressure. The solution is contained within a container having a wetting surface, wherein the liquid has a contact angle with the wetting surface of less than 80°, and optionally the contact angle is no greater than 60°, no greater than 50°, no greater than 40° or no greater than 30°. The pressure for the solution is reduced from the first pressure to a second pressure lower than the first pressure. The first pressure generally will be greater than atmospheric pressure. Optionally the first pressure is at least 1000 mbar greater than atmospheric pressure, or at least 2000 mbar, at least 3000 mbar, at least 4000 mbar, or at least 5000 mbar greater than atmospheric pressure. Generally, the second pressure will be no more than 1000 mbar greater than atmospheric pressure, and typically, the second pressure will be about atmospheric pressure.

Generally, the wetting surface is contacted with the solution prior to the step of reducing pressure so as to facilitate the solution becoming supersaturated during the step of reducing pressure. Also, the process typically is carried out in the absence of a non-wetting surface so as to facilitate the solution becoming supersaturated.

In embodiments, the liquid will be an aqueous based fluid (and can be water) and the wetting surface is hydrophilic. In embodiments, the liquid will be a non-polar hydrocarbon based fluid and the wetting agent will be oleophilic. In embodiments, the gas will dissolve in the liquid (in a non-supersaturated state) to an amount of at least 0.01 grams of gas per 100 g of water (or at least 0.015 grams per 100 g of water) at room temperature and atmospheric pressure.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

treated glass slide (FIG. 2C), and a (heptadecafluoro-1,1,2,2-tetrahydrodecyl)triethoxysilane (HT) treated glass slide (FIG. 2D).

DETAILED DESCRIPTION

The present disclosure may be understood more readily by reference to this detailed description as well as to the examples included herein. In addition, numerous specific details are set forth in order to provide a thorough understanding of the embodiments and examples described herein. However, those of ordinary skill in the art will understand the embodiments and examples described herein can be practiced without these specific details. In other instances, methods, procedures and components have not been described in detail so as not to obscure the related relevant feature being described. Also, the description is not to be considered as limiting the scope of the embodiments described herein.

In one aspect, the present disclosure relates to systems and processes to promote bubble nucleation and/or promote separation of a gas or gases from a liquid. Also, in other aspects, the present disclosure relates to systems and processes to suppress bubble nucleation in order to create supersaturated solutions of gas or gases in a liquid.

A gas can liberate either from a single component system through ebullition or cavitation or from a multi-component system through supersaturation of one or more of the dissolved gas components along with the ebullition and cavitation. Gas bubbles can also be formed in chemical processes such as electrolysis. The supersaturation of one or more dissolved gas components in a multicomponent system can be caused by either change in pressure and/or temperature of the system. The supersaturated state is metastable in nature and the definition of supersaturation is given below.

$$\text{Supersaturation}\,(\sigma) = \frac{X_m}{X_s} - 1,$$

where, $X_m$ is the concentration of dissolved gas at the metastable supersaturated state and $X_s$ is the thermodynamically stable concentration of dissolved gas at the corresponding system pressure and temperature.

The gas liberation process involves nucleation, bubble growth, and detachment stages. Bubble nucleation is classified into four different types. In Type 1 nucleation, also called as 'classical homogenous nucleation', bubbles form in the bulk of the liquid. Homogenous nucleation requires that the dissolved gas molecules overcome cohesive forces of the liquid molecules. As predicted by classical nucleation theory, the Type 1 nucleation requires very high levels of supersaturation. For example, spontaneous formation of hydrogen bubbles during the electrolysis of water requires a supersaturation ($\sigma$) ratio of about 100,000.

The Type 2 nucleation is called as 'classical heterogeneous nucleation' and it requires a similar level of supersaturation to Type 1 nucleation. However, the difference between Type 1 and Type 2 nucleations arises from the fact that in Type 2 nucleation, the first bubble forms inside a pit on the surface of a molecularly smooth container, or on a solid particle present in the bulk of the liquid. Once a bubble is formed inside a pit, it grows and detaches from the surface while leaving a portion of the gas back in the pit. The subsequent gas bubble production from that location is referred to as Type 3 nucleation that needs a much lower level of supersaturation in comparison to Type 1 and Type 2 nucleations. The Type 3 nucleation is called 'pseudo classical nucleation'. This allows for the energy barrier required to induce nucleation to be lower because of the preexisting gas cavities, a nucleation site. The Type 4 nucleation is called 'non-classical nucleation'. It requires almost no energy barrier for nucleation because the radius of curvature of the preexisting gas in the cavities is larger than the critical radius of curvature which produces the gas bubbles continuously, even at very low levels of supersaturations.

The second step in the gas liberation process is the bubble growth. Once the bubble nucleation step is completed, the bubble starts growing. Even though the factors responsible for the initial stage of the bubble growth are not clear, the later stage is mostly governed by the molecular diffusion to and through the gas bubble-liquid interface. In general, the bubble growth rate is observed to follow the following relation:

$$R = t^a$$

where R is the bubble radius at a given time, t. Different exponent values were reported for different gas-liquid systems. It implies that the exponent in the growth rate expression is system specific and should be exclusively measured or estimated for a given gas-liquid system.

The last stage of the gas liberation process is bubble detachment. The necessary condition for bubble detachment in a relatively stagnant system is that the buoyant and pressure forces, which are responsible for pulling the bubble away from the solid surface, dominate the surface tension force, which is responsible for keeping the bubble adhered to the solid surface. Individual bubbles can grow large enough to gain sufficient buoyant force for the detachment, or two or more bubbles can coalesce to become a large enough bubble for detachment. However, when the system has significant flow disturbances, other surface (drag) and body (inertial) forces also significantly contribute towards the bubble detachment process.

This disclosure is directed to the discovery that wettability of a solid surface in contact with a solution can affect bubble nucleation from solutions of gas in liquids. Moreover, the degree of wetting of the solid surface has strong influence on the onset pressure for bubble nucleation. Typically, as the wetting of the solid surface by the liquid decreases, the onset pressure for bubble nucleation increases or in other words required supersaturation for bubble nucleation decreases. A wettable solid surface suppresses bubble nucleation. So, the solid surface wetting nature can be engineered to either promote or suppress the bubble nucleation.

Generally, as used herein in "wetting", "wettability" and the like refer to the relative affinity of a fluid for an inert solid substrate in the presence of another immiscible or sparingly soluble fluid. Wettability is reflected in the ability of a liquid to maintain contact with a solid surface, resulting from intermolecular interactions when the two are brought together. The degree of wetting (wettability) is determined by a force balance between adhesive and cohesive forces. Adhesive forces between a liquid and solid cause a liquid drop to spread across the surface. Cohesive forces within the liquid cause the drop to ball up and avoid contact with the surface.

The contact angle ($\theta$) is the angle at which the liquid-vapor interface meets the solid-liquid interface. The contact angle is determined by the balance between adhesive and cohesive forces. As the tendency of a drop to spread out over a flat solid surface increases, the contact angle decreases. Thus, the contact angle provides an inverse measure of wettability with a contact angle of 0° representing perfectly wetting and a contact angle of 180° indicating perfectly non-wetting. Generally, a contact angle less than 90° (low contact angle) indicates that wetting of the surface is very favorable ("wetting surface"), and the fluid will spread over a large area of the surface. Contact angles greater than 90° (high contact angle) usually means that wetting of the surface is unfavorable ("non-wetting surface"), so the fluid will minimize contact with the surface and form a compact liquid droplet. For water, a wettable surface may also be termed hydrophilic and a non-wettable surface hydrophobic. Superhydrophobic surfaces have contact angles greater than 150°, showing almost no contact between the liquid drop and the surface.

This disclosure is directed, among other things, at processes that take advantage of the above discovery to promote bubble nucleation and/or to promote separation of a gas or gases from a liquid. Also, in some embodiments, the process takes advantage of the above discovery to suppress bubble nucleation in order to create supersaturated solutions of gas or gases in a liquid. As used herein, supersaturated solutions refer to a state of a solution that contains more of the dissolved gas than could be dissolved by the solvent (liquid) under normal circumstances—the prevailing pressure and temperature.

Thus, in accordance with some embodiments, this disclosure provides for a process for separating a gas out of a solution. The process comprises providing the solution of the gas in a liquid. The solution is subjected to conditions such that a supersaturated state of gas in the liquid is produced. The resulting supersaturated solution is contacted with a non-wetting surface so as to induce separation of the gas out of the solution. While generally surfaces having a contact angle of greater than 90° are preferred for the non-wetting surfaces, it has been found that surfaces having a contact angle of at least 800 are sufficient to enhance bubble nucleation. Thus, the liquid typically has a contact angle with the non-wetting surface of at least 800, and optionally the contact angle is greater than 90°, greater than 95°, greater than 100° or greater than 110°.

More specifically, some embodiments are directed to processes for promoting bubble nucleation or processes for separating a gas from solution within a liquid. Such processes can comprise providing a solution of a gas in a liquid. The solution can be produced at an elevated pressure-above atmospheric pressure-such that a greater concentration of gas is dissolved in the liquid than would dissolve in the liquid at atmospheric pressure. Generally, the elevated pressure is at least 1000 mbar greater than atmospheric pressure, or at least 2000 mbar, at least 3000 mbar, at least 4000 mbar, or at least 5000 mbar greater than atmospheric pressure. After the solution is produced, the pressure of the solution is reduced. Often this reduction will be to atmospheric pressure or about atmospheric but it could be any pressure less than the elevated pressure and can even be reduced to a pressure lower than atmospheric pressure.

As used herein, "about atmospheric" means close to but typically more than surrounding atmospheric pressure. More specifically, "about atmospheric" is typically a pressure from about 0 psig to about 10 psig, more typically up to about 5 psig. In terms of mbar, "about atmospheric" is typically from about 0 mbar to about 700 mbar above the surrounding atmospheric pressure, more typically up to about 350 mbar above the surrounding atmospheric pressure.

The solution is placed into contact with a non-wetting surface. Generally, the non-wetting surface can be placed into contact with the liquid prior to adding the gas to the liquid to make the solution; however, in some embodiments, the non-wetting surface is introduced to the solution after the solution is made but before pressure reduction. In other embodiments, non-wetting surface is introduced after pressure reduction; however, it is generally preferred that the non-wetting surface is introduced before the pressure reduction. For example, the non-wetting surface can be the inner surface of a container containing the solution or the non-wetting surface can be beads or rods (hydrophobic where water is the liquid) placed into the container with the solution, either before or after the solution is made. The surface can be non-wetting in its unaltered state or can be coated to have a non-wetting surface or to increase the contact angle of the surface.

The introduction of the non-wetting surface to the solution and the reduction in pressure promote bubble nucleation, hence promote separation of the gas from the liquid. In the absences of the non-wetting surface, the reduction in pressure results in the solution becoming a supersaturated solution. When the non-wetting surface is added after pressure reduction, a supersaturated solution is formed prior to introduction of the non-wetting surface.

To be a suitable non-wetting surface, the surface can be a solid surface with which the liquid has a contact angle of from 90° to 180°, with higher angles having a greater effect. However, under some conditions, it might be beneficial to have the contact angle lower than 90°. Typically, to be a suitable non-wetting solid surface, the liquid has a contact angle with the non-wetting surface of at least 80°, but more typically the contact angle is greater than 90°, greater than 95°, greater than 100° or greater than 110°.

In embodiments, the above-described processes for enhancing gas separation from a solution and enhancing bubble nucleation are carried out without a wetting surface being in contact with the solution. Additionally, in embodiments, the liquid is an aqueous based fluid (and can be water) and the non-wetting surface is hydrophobic. In other embodiments, the liquid is a non-polar hydrocarbon based fluid and the non-wetting surface will be oleophobic. In some of either of these embodiments, the gas will dissolve in the liquid (in a non-supersaturated state) to an amount of at least 0.01 grams of gas per 100 g of water (or at least 0.015 grams per 100 g of water) at room temperature and atmospheric pressure.

Other embodiments provide processes for suppressing bubble nucleation or suppressing the separation of a gas from solution within a liquid. Such processes are similar to the above-described process for promoting bubble nucleation except, instead of contacting the solution with a non-wetting surface, the solution is placed in a container with a wetting surface such that the solution is in contact with the wetting surface, which suppresses bubble nucleation and thus promotes the formation of a supersaturated solution. It is currently believed that the wetting surface is most beneficial if it is the inner surface of a container in which the gas and liquid are mixed to form the solution, but should at least be the container in which the solution undergoes pressure reduction. Further, the pressure reduction is generally carried out in the absence of a non-wetting surface being in contact with the solution.

To be a suitable wetting surface, the surface can be a solid surface with which the liquid has a contact angle of from 00 to less than 90°, with lower angles having a greater effect. Generally, the contact angle is lower than 90°; however, as will be realized from above, the contact angle for the wetting surface will generally be 80° or less. Thus, to be a suitable wetting solid surface, the liquid typically has a contact angle with the wetting surface of less than 80°, and optionally the contact angle is no greater than 60°, no greater than 50°, no greater than 40° or no greater than 30°.

Accordingly, in the suppression process, the solution is placed into contact with a wetting surface. Generally, the wetting surface is placed into contact with the liquid prior to adding the gas to the liquid to make the solution; however, in some embodiments, the non-wetting surface is introduced to the solution after the solution is made but before pressure reduction. It is generally required that the solution is only in contact with wetting surfaces during the pressure reduction. For example, the inner surface of a container for the solution and any other surfaces therein should be wetting surfaces (hydrophilic where water is the liquid). Suitable wetting surfaces can be wetting in their unaltered state or can be coated to be wetting or to decrease the contact angle of the surface.

The processes of the current disclosure can be better understood with reference to the Examples below. This Example utilizes water as the solvent (liquid) and carbon dioxide as the gas; however, the processes are not limited to these compounds. Beneficial results can be obtained from any liquid and gas. For example, the liquid can be an oil and the gas can be methane.

In embodiments, the liquid will be an aqueous based fluid (and can be water) and the wetting surface is hydrophilic. In embodiments, the liquid will be a non-polar hydrocarbon based fluid and the wetting agent will be oleophilic. In some of either of these embodiments, the gas will dissolve in the liquid (in a non-supersaturated state) to an amount of at least 0.01 grams of gas per 100 g of water (or at least 0.015 grams per 100 g of water) at room temperature and atmospheric pressure.

EXAMPLES

1. Materials

Chlorinated polydimethylsiloxane (CM), chlorinated fluoroalkylmethylsiloxane (CF), and (heptadecafluoro-1,1,2,2-tetrahydrodecyl)triethoxysilane (HT) from Gelest Inc. were used to prepare hydrophobic surfaces. The solvents used in the wettability alteration process were toluene (99.7%), isopropyl alcohol (99%), and ethanol (absolute) from Pharmco-Aaper, and n-hexane (99.7%) from VWR. Glacial acetic acid that was used as a catalyst in preparing HT treated surfaces was obtained from Pharmco-Aaper. Glass slides (25 mm×75 mm) and beads (3 mm diameter) were obtained from Fishers Scientific and the glass vials (12 mm diameter×25 mm height) were from VWR. 50 mL polypropylene centrifuge tubes (from Fisher Scientific) were chosen as the reaction vessels as they do not react with the chemicals utilized in the surface chemical treatment process.

2. Wettability Alteration Procedure

CM, CF, and HT with the respective experimental procedures discussed below were used to prepare the hydrophobic surfaces. First, the glass substrates were rinsed with toluene in the case of CM and CF treatments, and isopropanol for HT treatment. Then, a 95/5 wt % isopropanol/water mixture was prepared and a 0.02 wt % glacial acetic acid was added as a catalyst to the mixture to facilitate the hydrolysis of silane (HT). To ensure complete hydrolysis, the solution was kept for 30 minutes before the glass substrates were added for the surface chemical reactions to occur. The siloxanes (10 wt % CM or 10 wt % CF) were dissolved in toluene. Subsequently, the substrates were added to the respective solutions and the solutions were thoroughly shaken using a shaker (made by Benchmark Scientific ad model SB-12L shaking water bath) for 60 minutes at 150 rpm to ensure the reaction between substrates and the solutions. To remove any unreacted siloxanes, and silane, the substrates were rinsed in n-hexane and ethanol, and ethanol, respectively. The untreated glass vials, beads, and slides used in this work were inherently hydrophilic. To remove any undesired polar and non-polar compounds adsorbed on these surfaces, they were rinsed with n-hexane and ethanol. The treated and untreated substrates were dried in an oven at 105° C. for 30 minutes. The dried glass samples were used for contact angle and AFM measurements, and bubble nucleation experiments.

3. Static Contact Angle Measurements

Contact angle measurement characterizes the degree of wettability of a solid surface to a fluid in the presence of another fluid. A goniometer consists of a horizontally positioned digital microscope (distributed by Dunwell Tech. Inc. as Dino-Lite™ Digital Microscope model AM7815MZTL), and a cold background light source with a diffusor, and a height adjustable stage, was used for contact angle measurements in this work. A 5 μL water droplet was carefully placed on a treated or an untreated glass slide that was placed on the stage and the image of the droplet was taken. The air-water static contact angles were obtained from the droplet images using Low-Bond Axisymmetric Drop Shape Analysis (LBADSA) plug-in in ImageJ program (an open source image processing program). A minimum of five contact angle measurements on different substrates of each type were made and the average contact angles with the corresponding standard deviations are reported below in Section 7, Results.

4. Atomic Force Microscopy (AFM) Measurements

To examine the roughness of the substrates before and after chemical treatment processes, AFM measurements were conducted on hydrophilic, CM, CF, and HT glass slides, vials, and beads. The equipment used for the AFM measurements was a Digital Instruments, Veeco Metrology Group, Nanoscope V electronics with an optical microscope for tip positioning. 2D and 3D topography images of the above surfaces were collected using tapping mode. The average roughness ($R_a$) values of the surfaces on three different substrates of each type with the corresponding standard deviations are reported below in Section 7, Results.

5. Bubble Nucleation Experimental Facility

Figure 1:
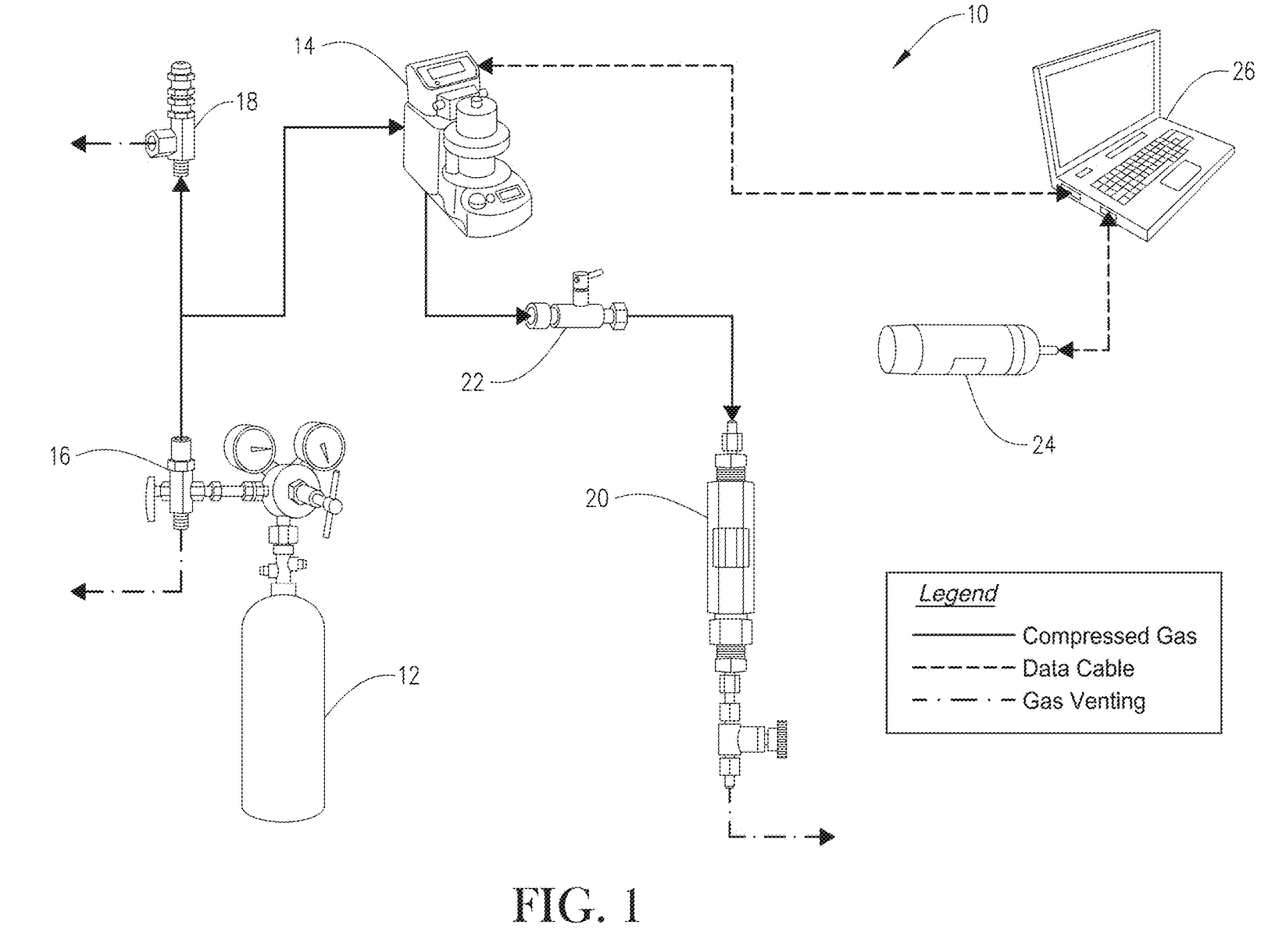
FIG. 1 is a schematic diagram of a system for bubble nucleation experiments as used in the Examples of this disclosure.
Figure 2A:
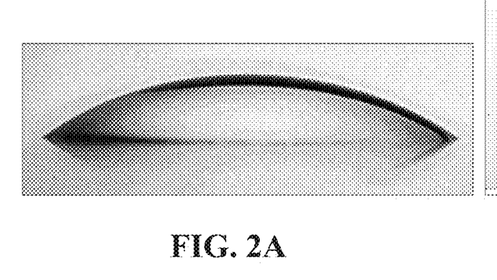
FIGS. 2A, 2B, 2C and 2D are images showing the air-water contact angle for untreated glass slide (FIG. 2A), a chlorinated polydimethylsiloxane (CM) treated glass slide (FIG. 2B), a chlorinated fluoroalkylmethylsiloxane (CF)
Figure 2B:
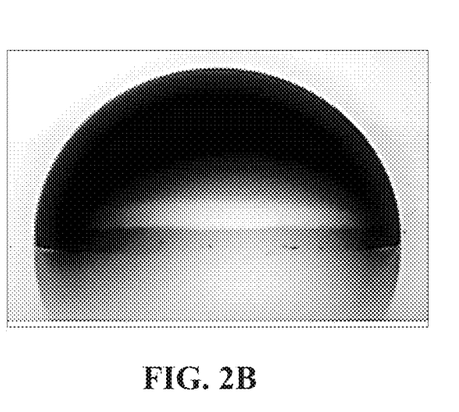
Figure 2C:
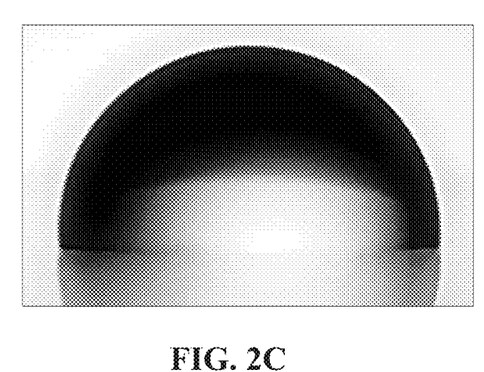
Figure 2D:
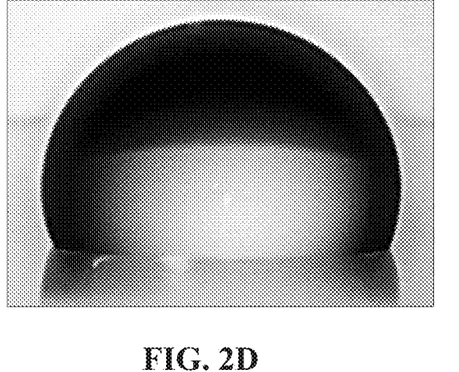

A schematic of the experimental system 10 used for the bubble nucleation experiments of these Examples is shown in FIG. 1. System 10 comprised an ultra-high purity $CO_2$ cylinder 12 which was connected to a microfluidic pump 14 via a 3-way valve 16 and a pressure relief valve (PRV) 18. Microfluidic pump 14 had a capability to precisely control the process fluid flow rate (30-1000 μL/min) and pressure (0-10000 mbar). The pump was provided with software, marketed as Flow Control Center Software by Dolomite Microfluidics part of Blacktrace Holdings Ltd., to control pressure or flow rate. The software was run on a process control and data acquisition system 26, which can be a conventional computer system.

Microfluidic pump 14 was connected to an inline-flow sight pressure cell 20 through flow valve 22. Inside pressure cell 20, a clean glass vial was placed. The vial was filled with deionized water to 5 mm height.

A digital microscope 24 (distributed by Dunwell Tech. Inc. as Dino-Lite™ Digital Microscope model AM7815MZTL) was used for observing and documenting the bubble nucleation phenomena. It has a magnification range of 5×-140× with 1.3 megapixel resolution and extended depth of field feature. Digital microscope 24 was connected via a data cable to process control system 26. These features help to obtain good quality images and videos during bubble nucleation experiments. DinoCapture 2.0: Microscope Imaging Software (also from Dino-Lite Digital Microscope) was used on process control system 26 to capture images and record videos.

6. Bubble Nucleation Experiments

Before performing the bubble nucleation experiments, the saturation time required for $CO_2$ in water was estimated using the one-dimensional bounded diffusion equation. The dimensionless time equation is given below from R. B. Bird, W. E. Stewart, E. N. Lightfoot, Transport phenomena. 2002, John Wiley & Sons, New York (2004).

$$t = \frac{\tau * l^2}{D}$$

where, $\tau$ is the dimensionless time, D is the diffusion coefficient in $mm^2$/sec, t is the diffusion time in seconds, and l is the height of the water column in mm. The following parameters were used for estimating the time required for $CO_2$ to saturate 5 mm height of water: $\tau=4$; $D_{CO_2\text{-}water}=0.0016$ $mm^2$/sec; and l=5 mm. The estimated saturation time was approximately 17 hours for 99.99% saturation at the bottom of the water column; however, to ensure complete saturation, a 24-hour saturation time was used for the bubble nucleation experiments.

Figure 5A:
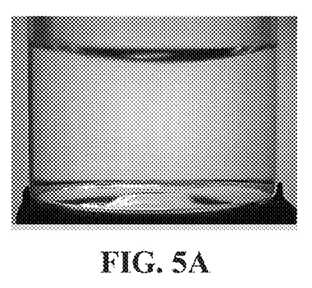
FIGS. 5A, 5B and 5C are images showing bubble nucleation in hydrophilic vial after 24-hour saturation time at 6000 mbar (FIG. 5A); at zero mbar step-down pressure (FIG. 5B); and while inserting polypropylene substrate (FIG. 5C).
Figure 5B:
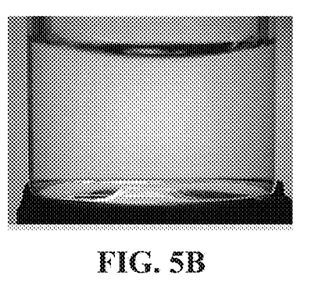
Figure 5C:
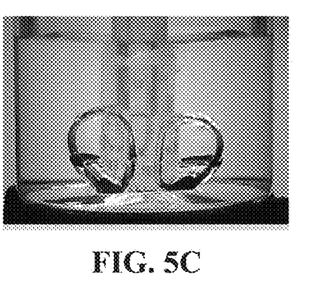

For hydrophilic vial surfaces, the glass vial was filled with deionized water (17.5 MΩ·cm) to a height of 5 mm and placed it inside the pressure cell. $CO_2$ was injected by the P-pump to the pressure cell to flush out the trapped air for 30 minutes at 6000 mbar pressure and then the pressure cell's exit valve was closed for saturation for 24 hours. Since the lid of the glass vial inside the cell was opened, water in the vial can be saturated with $CO_2$. After the saturation time at 6000 mbar no nucleation was observed, as shown in FIG. 5A. Next, the pressure was reduced by 1000 mbar and kept constant for 15 minutes to observe any bubble nucleation. Bubble nucleation was not observed even when the pressure was reduced to 0 mbar, as shown in FIG. 5B. However, it was observed that inserting a polypropylene tube in the $CO_2$ supersaturated water after opening the pressure cell caused instantaneous and vigorous bubble nucleation, as shown in FIG. 5C.

The bubble nucleation experiments were conducted using the 10% CM, 10% CF, and 10% HT coated vials. The similar procedure was repeated which includes: installation of the vial inside the cell, flushing out trapped air for 30 minutes by flowing $CO_2$ at a pressure of 6000 mbar, and saturating it for 24 hours. A step-down pressure of 500 mbar was used for every 15 minutes after saturation time to observe the bubble nucleation. When the bubble nucleation was observed, a smaller step-down pressure of 100 mbar was used in the next repeatability run to determine the bubble nucleation pressure more accurately. All the experiments were carried out at room temperature of 22-23° C. All the images and videos were recorded using Dino-Lite digital microscope.

7. Results

Figure 3:
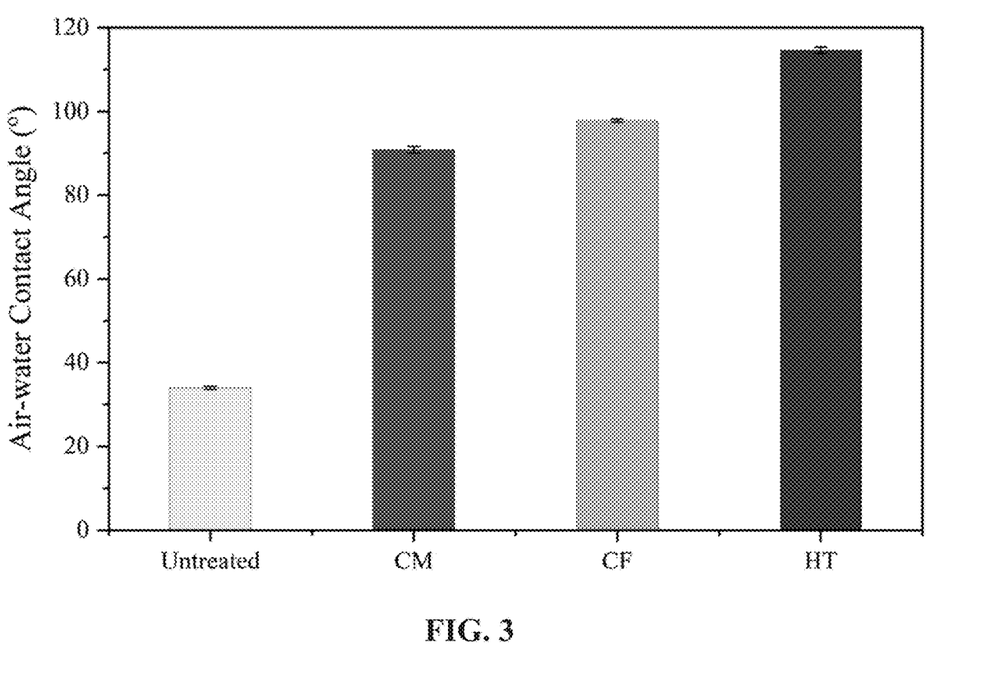
FIG. 3 is a graph illustrating the average air-water contact angle data of untreated (hydrophilic) and treated (hydrophobic: CM, CF, and HT) glass surfaces.
Figure 4A:
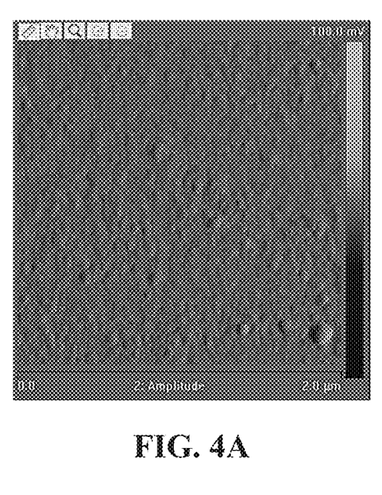
FIGS. 4A, 4B, 4C and 4D are images showing surface topographies of untreated (FIG. 4A), CM treated (FIG. 4B), CF treated (FIG. 4C) and HT treated (FIG. 4D) glass slides.
Figure 4B:
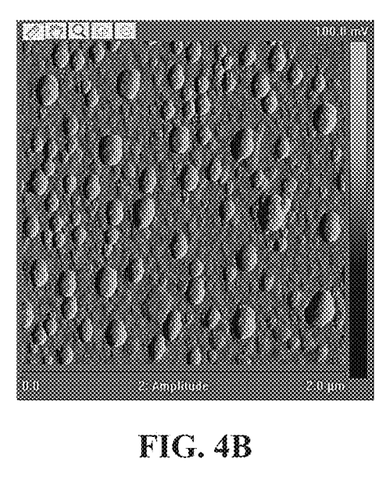
Figure 4C:
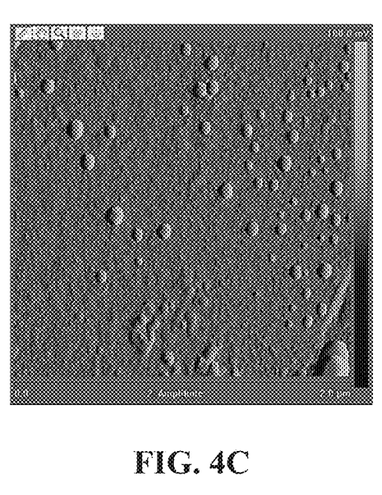
Figure 4D:
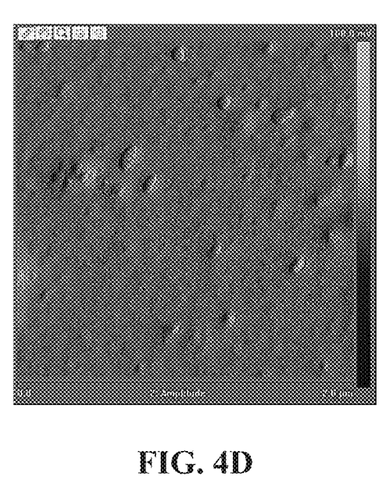

FIGS. 2A, 2B, 2C and 2D present the air-water contact angle measurements on untreated, CM, CF, and HT treated glass slides, respectively. The average contact angles of five replicates and their standard deviations are given in FIG. 3. The average air-water contact angle on untreated glass samples was found to be 33.9°±0.4°. On CM, CF and HT treated surfaces, the corresponding contact angle data were 90.8°±0.8°, 97.8°±0.4° and 114.6°±0.750, respectively. Less than 1° standard deviation in the contact angle data indicates a high degree of reproducibility of the wettability alteration procedures.

FIGS. 4A, 4B, 4C and 4D show the 2D surface topography images obtained from AFM measurements on untreated, and CM, CF and HT treated glass slides, respectively. The average roughness values of untreated, CM, CF, and HT treated glass slides are 1.1±0.1 nm, 6.6±0.7 nm, 2.9±0.2 nm, and 2.4±0.2 nm, respectively. The average roughness data of the curved (vial) and glass bead surfaces used for bubble nucleation experiments are summarized in Table 1. It can be observed in Table 1 that untreated surfaces have the lowest roughness. Similarly, the bead surfaces have higher surface roughness compared to the flat and curved surfaces.

TABLE 1

Summary of roughness measurements of the treated and untreated glass surfaces

| | Average Roughness (nm) | | |
|---|---|---|---|
| | Flat (Slide) Surface | Curved Surface | Bead Surface |
| Untreated | 1.1 ± 0.1 | 3.6 ± 0.3 | 11.7 ± 0.8 |
| | 6.6 ± 0.7 | 6.4 ± 2.7 | 18.9 ± 4.6 |
| | 2.9 ± 0.2 | 4.4 ± 1.3 | 16.9 ± 5.5 |
| | 2.4 ± 0.2 | 7.4 ± 1.0 | 16.7 ± 1.5 |

After the saturation period, the pressure was reduced to a predetermined value to create a supersaturated solution and observed it for bubble nucleation using the microscope. Then the pressure was further reduced to another predetermined value. Pressure reduction steps of 1000 mbar, 500 mbar and 100 mbar were used to identify initiation pressure for bubble nucleation. Interestingly, no bubbles were formed in the hydrophilic vial even when the pressure was reduced to atmospheric pressure as shown in FIG. 5B. More interestingly, the mechanical disturbance caused while opening the top endcap of the pressure cell also could not be able to initiate the bubble nucleation. Then, spontaneous bubble nucleation occurred when a polypropylene substrate was immersed in the supersaturated liquid, as shown in FIG. 5C. The spontaneous bubble nucleation occurred only on the immersed polypropylene substrate surface and not on the hydrophilic vial surface as can be seen in FIG. 5C.

Figure 6A:
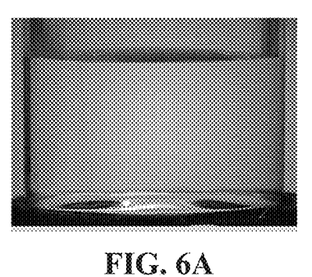
FIGS. 6A, 6B and 6C are images showing bubble nucleation in CM coated vial after 24-hour saturation time at 6000 mbar (FIG. 6A); at the beginning of bubble nucleation at 5000 mbar (FIG. 6B); and at zero mbar (FIG. 6C).
Figure 6B:
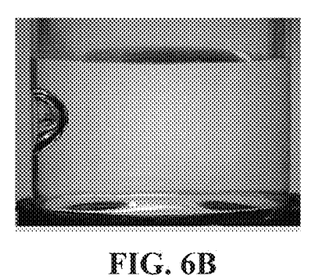
Figure 6C:
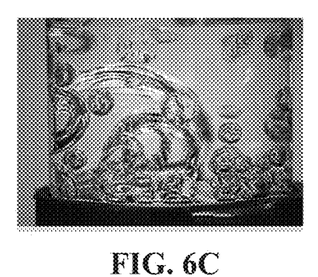
Figure 7A:
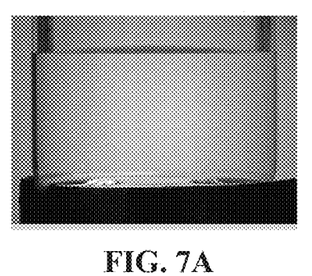
FIGS. 7A, 7B and 7C are images showing bubble nucleation in CF treated vial after 24-hour saturation time at 6000 mbar (FIG. 7A); at the beginning of bubble nucleation at 5100 mbar (FIG. 7B); and at zero mbar (FIG. 7C).
Figure 7B:
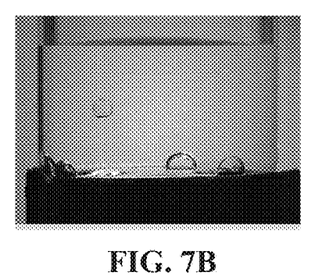
Figure 7C:
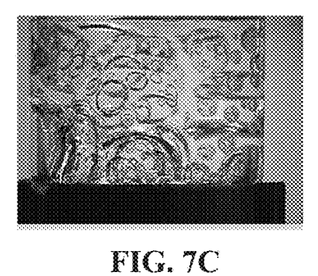
Figure 8A:
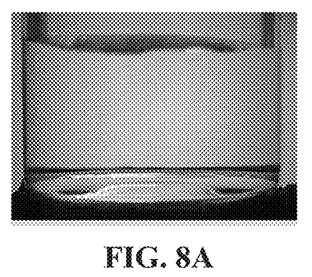
FIGS. 8A, 8B and 8C are images showing bubble nucleation in HT treated vial after 24-hour saturation time at 6000 mbar (FIG. 8A); at the beginning of bubble nucleation at 5500 mbar (FIG. 8B); and at zero mbar (FIG. 8C).
Figure 8B:
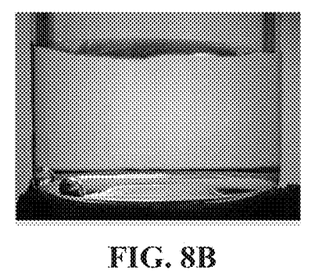
Figure 8C:
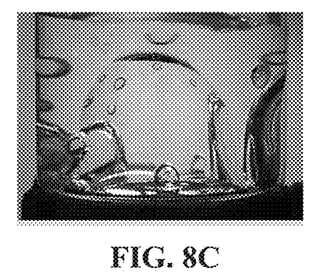
Figure 9:
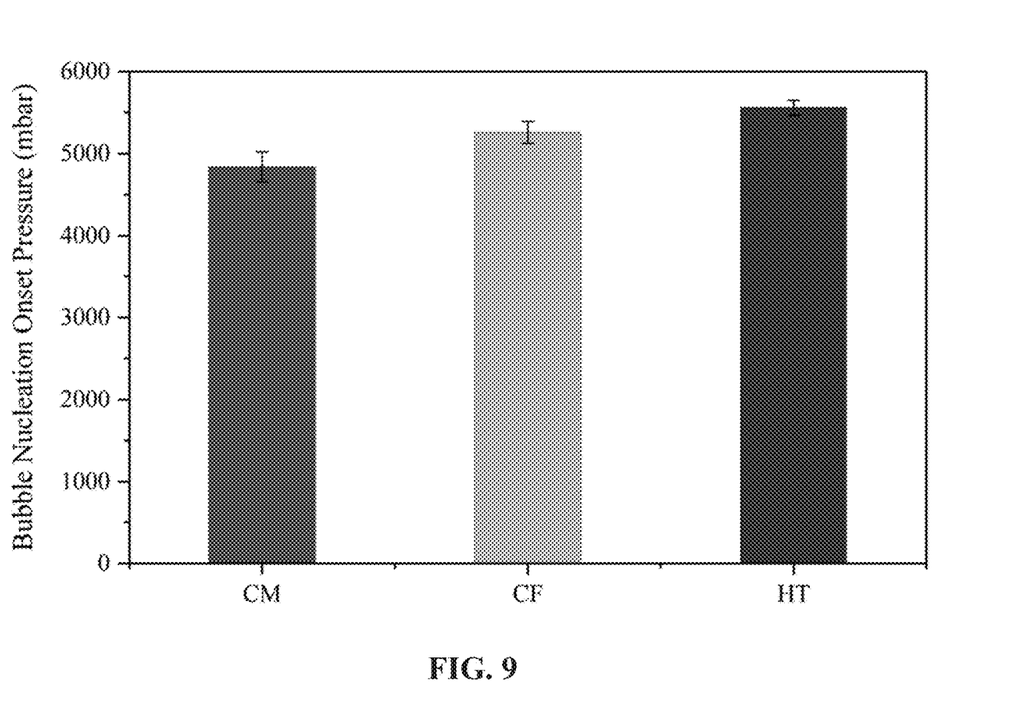
FIG. 9 is a graph showing average bubble nucleation onset pressures in CM, CF and HT treated vials.

FIGS. 6A, 7A and 8A show the $CO_2$ saturated water in the CM, CF, and HT treated vials at 6000 mbar after the saturation period. As shown in FIGS. 6B, 7B and 8B, bubble nucleation occurred on CM, CF, and HT vial surfaces at the onset pressures of 5000 mbar, 5100 mbar, and 5500 mbar, respectively. FIG. 9 shows the average onset pressures of five independent experiments and their standard deviations for gas bubble nucleation in CM, CF, and HT treated vials, respectively.

The average onset pressure for gas bubble nucleation in CM treated vials was 4840 mbar and the standard deviation was 182 mbar. For CF treated vials, the average onset pressure was 5260 mbar with a standard deviation of 134 mbar. Similarly, for HT treated vials the corresponding values were 5560 mbar and 89 mbar respectively. From the above data, it can be concluded that the onset pressure for bubble nucleation increases as the hydrophobicity increases. In other words, the required supersaturation to initiate the bubble nucleation decreases as the hydrophobicity increases. The observed bubble nucleation on the hydrophobic surfaces may be due to any trapped gas or nanobubbles at the solid-liquid interface and/or due to the relatively weaker adhesive forces between water and hydrophobic surface and the resulting easier water film rupture, compared to the hydrophilic surface. (As discussed in N. Ishida, T. Inoue, M. Miyahara, K. Higashitani, *Nano bubbles on a hydrophobic surface in water observed by tapping-mode atomic force microscopy*, Langmuir 16(16) (2000) 6377-6380; and N. Ishida, K. Higashitani, *Interaction forces between chemically modified hydrophobic surfaces evaluated by AFM—The role of nanoscopic bubbles in the interactions*, Miner. Eng. 19(6-8) (2006) 719-725.)

Figure 10A:
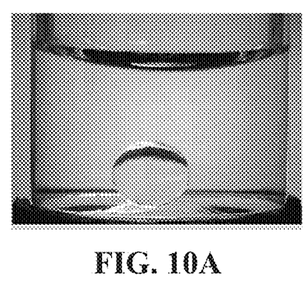
FIGS. 10A, 10B and 10C are images showing bubble nucleation in a hydrophilic vial with one hydrophilic glass bead after 24-hour saturation time at 6000 mbar (FIG. 10A); at 0 mbar (FIG. 10B); and after inserting a plastic tube (FIG. 10C).
Figure 10B:
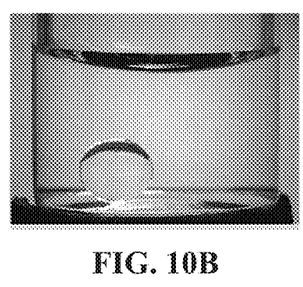
Figure 10C:
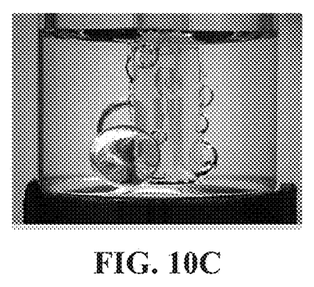
Figure 11A:
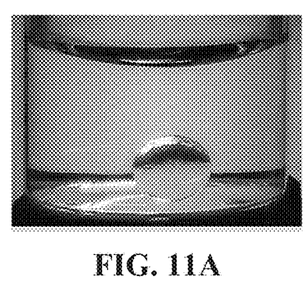
FIGS. 11A, 11B and 11C are images showing bubble nucleation in a hydrophilic vial containing one treated CM glass bead after 24-hour saturation time at 6000 mbar (FIG. 11A); at the beginning of bubble nucleation at 4900 mbar (FIG. 11B); and zero mbar (FIG. 11C).
Figure 11B:
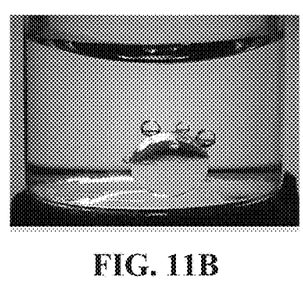
Figure 11C:
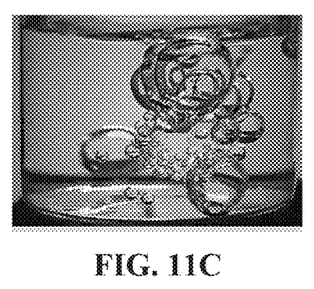
Figure 12A:
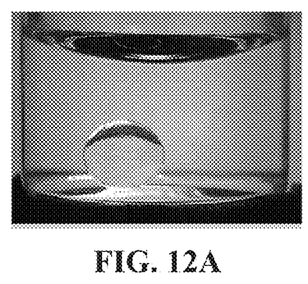
FIGS. 12A, 12B and 12C are images showing bubble nucleation in a hydrophilic vial containing one treated CF glass bead after 24-hour saturation time at 6000 mbar (FIG. 12A); at the beginning of bubble nucleation at 5200 mbar (FIG. 12B); and zero mbar (FIG. 12C).
Figure 12B:
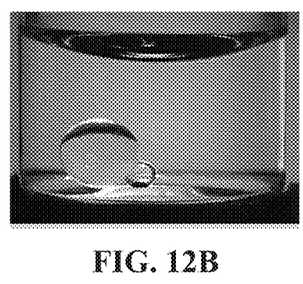
Figure 12C:
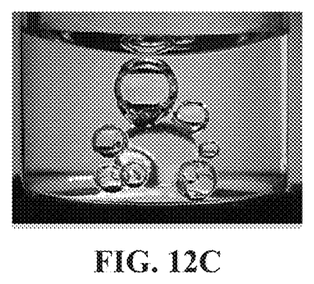
Figure 13A:
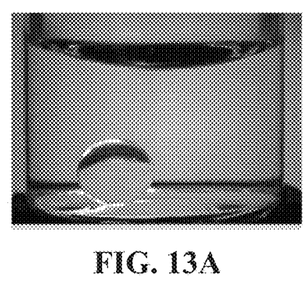
FIGS. 13A, 13B and 13C are images showing bubble nucleation in a hydrophilic vial containing one treated HT glass bead after 24-hour saturation time at 6000 mbar (FIG. 13A); at the beginning of bubble nucleation at 5700 mbar (FIG. 13B); and zero mbar (FIG. 13C).
Figure 13B:
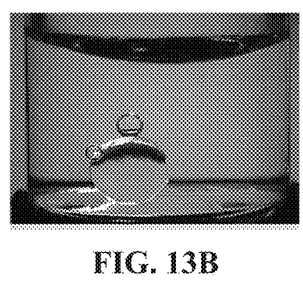
Figure 13C:
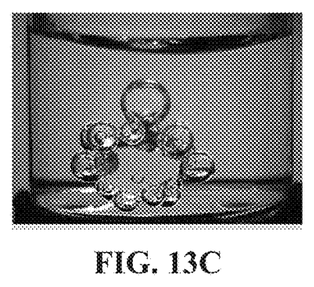

To further confirm the observed relationship of the onset pressure for bubble nucleation and hydrophobicity, bubble nucleation experiments were conducted using untreated, CM, CF, and HT treated glass beads of 3 mm diameter in hydrophilic vials. As expected, no bubble nucleation was observed on the hydrophilic glass bead even when the step-down pressure was reduced to atmospheric pressure (shown in FIG. 10B). However, as shown in FIG. 10C, insertion of the polypropylene substrate caused spontaneous bubble nucleation. Again, as expected, bubble nucleation occurred on glass beads coated with CM, CF and HT at 4900 mbar (FIG. 11B), 5200 mbar (FIG. 12B), and 5700 mbar (FIG. 13B) step-down pressures, respectively. It can be noted that these bubble-nucleation onset pressures are very close to the respective onset pressures on the corresponding vial surfaces (shown in FIG. 9). These observations confirm that the degree of hydrophobicity has a strong influence on the onset pressure for bubble nucleation.

From this experimental investigation on the influence of wettability on the onset pressure for bubble nucleation from supersaturated solutions of $CO_2$ in water, it can be seen that the degree of hydrophobicity of the solid surface has strong influence on the onset pressure for bubble nucleation. This Example demonstrates that as the hydrophobicity increases, the onset pressure for bubble nucleation increases or in other words required super saturation for bubble nucleation decreases. A clean hydrophilic surface suppresses bubble nucleation. So, the solid surface wetting nature can be engineered to control to either promote or suppress the bubble nucleation.

What is claimed is:

1. A process for suppressing bubble nucleation, the process comprising:
   providing a solution of a gas in a liquid at a first pressure so that the liquid is saturated with gas in solution at the first pressure, and wherein the gas solubility in the liquid is an amount of at least 0.01 grams per 100 grams of liquid at room temperature and atmospheric pressure;
   containing the solution within a container having a wetting surface, wherein the liquid has a contact angle with the wetting surface of less than 800; and
   reducing pressure for the solution from the first pressure to a second pressure lower than the first pressure; wherein the wetting surface is contacted with the solution prior to the step of reducing pressure so as to facilitate the solution becoming supersaturated during the step of reducing pressure, and wherein the process is carried out in the absence of a non-wetting surface contacting the solution.

2. The process of claim 1, wherein the first pressure is at least 1000 mbar greater than atmospheric pressure.

3. The process of claim 2, wherein the contact angle is no greater than 60°.

4. The process of claim 3, wherein the liquid is water and the non-wetting surface is hydrophilic.

5. The process of claim 4, wherein the first pressure is at least 2000 mbar greater than atmospheric pressure and the second pressure is about atmospheric.

6. The process of claim 5, wherein the contact angle is no greater than 30°.

7. The process of claim 6, wherein the first pressure is at least 5000 mbar greater than atmospheric pressure.

8. The process of claim 4, wherein the gas solubility in the water is an amount of at least 0.015 grams per 100 grams of water at room temperature and atmospheric pressure.

9. The process of claim 1, wherein the first pressure is between about 1000 mbar and about 6000 mbar greater than atmospheric pressure.

* * * * *

UNITED STATES PATENT AND TRADEMARK OFFICE
CERTIFICATE OF CORRECTION

PATENT NO. : 11,266,927 B2
APPLICATION NO. : 16/569248
DATED : March 8, 2022
INVENTOR(S) : Prem Kumar Bikkina It is certified that error appears in the above-identified patent and that said Letters Patent is hereby corrected as shown below:

In the Specification

Column 6, Line 14, replace "800" with --80°--

Column 6, Line 16, replace "800" with --80°--

Column 7, Line 42, replace "00" with --0°--

Column 10, Line 62, replace "114.6° ± 0.750" with --114.6° ± 0.75°--

Signed and Sealed this
Thirteenth Day of August, 2024

Katherine Kelly Vidal
*Director of the United States Patent and Trademark Office*